United States Patent
Xie

(10) Patent No.: US 11,716,673 B2
(45) Date of Patent: Aug. 1, 2023

(54) ACCESS REJECTION METHOD, APPARATUS AND SYSTEM, AND STORAGE MEDIUM AND PROCESSOR

(71) Applicant: ZTE CORPORATION, Guangdong (CN)

(72) Inventor: Zhenhua Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/994,733

(22) Filed: Nov. 28, 2022

(65) Prior Publication Data

US 2023/0093723 A1    Mar. 23, 2023

Related U.S. Application Data

(63) Continuation of application No. 16/874,515, filed on May 14, 2020, now Pat. No. 11,516,727, which is a (Continued)

(30) Foreign Application Priority Data

Nov. 17, 2017    (CN) .......................... 201711144738.5

(51) Int. Cl.
*H04W 48/02* (2009.01)
*H04W 12/0431* (2021.01)
(Continued)

(52) U.S. Cl.
CPC ......... *H04W 48/02* (2013.01); *H04L 63/0853* (2013.01); *H04W 12/0431* (2021.01); *H04W 12/06* (2013.01)

(58) Field of Classification Search
CPC ............. H04W 76/27; H04W 74/0833; H04W 52/0229; H04W 12/06; H04W 12/1006;
(Continued)

(56) References Cited

U.S. PATENT DOCUMENTS 6,707,915 B1 *    3/2004   Jobst ..................... H04W 12/35
                                                            713/184
10,873,464 B2 *  12/2020   Muhanna ............ H04W 12/041
(Continued)

FOREIGN PATENT DOCUMENTS

CN          101022330 A       8/2007
CN          101951603 A       1/2011
(Continued)

OTHER PUBLICATIONS

3GPP RAN2: "LS on security during Resume reject in Inactive state in NR" 3GPP TSG SA WG3 (Security) Meeting #89; S3-173023; Dec. 1, 2017; Reno, USA (2 pages).
(Continued)

*Primary Examiner* — Matthew C Sams
(74) *Attorney, Agent, or Firm* — Foley & Lardner LLP

(57) ABSTRACT

Disclosed are an access rejection method, apparatus and system, where the access rejection method includes: a first base station receives an access request from a terminal; and the first base station sends an access rejection message to the terminal; where the access rejection message at least carries: a check value generated based on a key of the terminal and at least part of contents of the access rejection message. And further disclosed are related computer storage media and processors.

3 Claims, 4 Drawing Sheets

Related U.S. Application Data continuation of application No. PCT/CN2018/099811, filed on Aug. 10, 2018.

(51) Int. Cl.
  *H04L 9/40* (2022.01)
  *H04W 12/06* (2021.01)

(58) Field of Classification Search
  CPC ......... H04W 36/0033; H04W 36/0055; H04W 48/02; H04W 12/04031; H04J 11/0056; H04L 63/0853
  See application file for complete search history.

(56) References Cited

U.S. PATENT DOCUMENTS

| | | | |
|---|---|---|---|
| 2014/0051447 A1* | 2/2014 | Li | H04W 36/0079 455/437 |
| 2015/0230276 A1* | 8/2015 | Jung | H04W 72/563 370/329 |
| 2017/0215132 A1 | 7/2017 | Moisanen et al. | |
| 2017/0331670 A1* | 11/2017 | Parkvall | H04W 52/0251 |
| 2017/0332436 A1 | 11/2017 | Chen | |
| 2018/0013568 A1* | 1/2018 | Muhanna | H04L 9/0825 |
| 2018/0020382 A1* | 1/2018 | Kim | H04W 48/02 |
| 2018/0213452 A1* | 7/2018 | Kim | H04L 5/0091 |
| 2018/0279204 A1* | 9/2018 | Kim | H04W 48/02 |
| 2019/0191483 A1* | 6/2019 | Ryoo | H04W 76/30 |
| 2019/0327647 A1* | 10/2019 | Ozturk | H04W 12/106 |
| 2020/0037345 A1* | 1/2020 | Ryoo | H04W 76/27 |
| 2020/0205003 A1* | 6/2020 | Ingale | H04L 9/3242 |
| 2020/0214070 A1* | 7/2020 | Ingale | H04W 74/0833 |
| 2020/0288362 A1* | 9/2020 | Säily | H04W 48/20 |

FOREIGN PATENT DOCUMENTS

| | | | | |
|---|---|---|---|---|
| CN | 102804829 A | | 11/2012 | |
| CN | 103155614 A | | 6/2013 | |
| CN | 103945358 A | | 7/2014 | |
| CN | 107071775 A | | 8/2017 | |
| EP | 1 513 364 A2 | | 3/2005 | |
| EP | 1 513 364 A3 | | 3/2005 | |
| EP | 2 906 011 A2 | | 8/2015 | |
| EP | 3 193 557 A1 | | 7/2017 | |
| EP | 3 713 271 B1 | | 9/2020 | |
| EP | 3713271 B1 * | 8/2022 | ............. H04L 63/12 |
| KR | 20080081753 A * | 3/2007 | |
| KR | 20080081753 A | | 9/2008 | |
| KR | 20090046688 A * | 10/2008 | |
| KR | 20090046688 A | | 5/2009 | |
| KR | 20140046071 A | | 4/2014 | |
| RU | 2011140357 A | | 4/2013 | |
| RU | 2541913 C2 | | 2/2015 | |
| WO | WO-2014166457 A2 * | 10/2014 | ........ H04W 36/0055 |
| WO | WO-2016/095139 A1 | | 6/2016 | |

OTHER PUBLICATIONS

ERICSSON: "draft CR for RRC Connection Suspend and Resume" 3GPP TSG-RAN WG2 Meeting #93; R2-161744; Feb. 19, 2016; St. Julian's, Malta (21 pages).

Extended European Search Report for EP Appl. No. 18877661.1, dated Jul. 2, 2021 (10 pages).

Final Office Action on U.S. Appl. No. 16/874,515 dated Feb. 15, 2022.

First Office Action for CN Appl. No. 201711144738.5 dated Mar. 29, 2021 (14 pages, including English translation).

First Office Action for JP Appl. No. 2020-526952, dated Oct. 1, 2021 (with English translation, 7 pages).

First Office Action for KR Appl. No. 10-2020-7017196, dated May 27, 2021 (with English translation, 6 pages).

First Office Action for RU Appl. No. 2020119750 dated Oct. 2, 2020 (6 pages).

International Search Report and Written Opinion of the International Searching Authority on PCT/CN2018/099811, dated Oct. 23, 2018 (9 pages).

Non-Final Office Action on U.S. Appl. No. 16/874,515 dated Dec. 22, 2020.

Notice of Allowance on U.S. Appl. No. 16/874,515 dated Sep. 14, 2022.

RAN WG2, "3GPP TSG-RAN WG2 Meeting #99bis R2-1712052", LS on security during Resume reject in Inactive state in NR, Prague, Oct. 16, 2017 (2 pages).

RAN WG2: "LS on security during Resume reject in Inactive state in NR" 3GPP TSG-RAN WG2 Meeting #99bis; R2-1712052; Oct. 13, 2017; Prague, Czech Republic (2 pages).

U.S. Office Action on U.S. Appl. No. 16/874,515 dated Apr. 27, 2021.

U.S. Office Action on U.S. Appl. No. 16/874,515 dated Aug. 27, 2021.

ZTE, "3GPP TSG SA WG3 (Security) Meeting #89 S3-173072", Security aspects of Resume Reject in Inactive state in NR, Nevada, Nov. 20, 2017, (4 pages).

* cited by examiner

ACCESS REJECTION METHOD, APPARATUS AND SYSTEM, AND STORAGE MEDIUM AND PROCESSOR

CROSS-REFERENCE TO RELATED APPLICATIONS

This application is a continuation of U.S. patent application Ser. No. 16/874,515, filed on May 14, 2022, which claims the benefit of priority under 35 U.S.C. § 120 as a continuation of International Patent Application No. PCT/CN2018/099811, filed on Aug. 10, 2018, which claims priority to a Chinese patent application No. 201711144738.5 filed on Nov. 17, 2017, application of which is incorporated herein by reference in its entirety.

TECHNICAL FIELD

The present application relates to the field of communications and, in particular, to an access rejection method, apparatus and system, a computer storage medium and a processor.

BACKGROUND

The 3rd Generation Partnership Project (3GPP) proposes a solution of rejecting an access of an inactive terminal. As shown in FIG. 1, FIG. 1 is a schematic diagram of a process of an access rejection in the related art of the present disclosure, where a base station system is used to establish a wireless connection with a terminal so that the terminal may access to a mobile network. The process of this solution includes steps described as follows.

Step 101: a terminal (a user equipment (UE)) used to access to a wireless mobile network through a base station system A (such as a gNB, or an eNB1), which retains UE-related security information, including a key, then the UE enters an inactive state, in which the UE and the base station system A will still retain information for communication, including security information, but both will release wireless connection resources;

step 102: the terminal hopes to regain an access to a mobile network at a certain time, but the UE may move to a coverage of a base station system B, and the UE sends an access resume request to the base station system B, such as sending a radio resource control (RRC) resume request message; and step 103: the base station system B receives the access resume request, and hopes that the terminal will try to restore the access after waiting for a period of time, then the base station system B sends an access rejection message, such as a reject message, to the UE.

In the related art, if the reject message does not have any security protection, an illegal base station may also send the access rejection message to the terminal, thereby making the terminal cannot access to the network all the time, and the illegal base station even sends short waiting try time information, so that the terminal frequently sends an access resume request and is rejected, resulting in terminal power exhaustion.

In view of the above problem in the related art, no effective solution has yet been proposed.

SUMMARY

Embodiments of the present disclosure provide an access rejection method, apparatus and system, a computer storage medium and a processor, so as to at least solve a technical problem that a terminal cannot verify validity of an access rejection message in the related art.

An access rejection method is provided according to an embodiment of the present disclosure, and the method includes steps described below. A first base station receives an access request from a terminal; and the first base station sends an access rejection message to the terminal; where the access rejection message carries at least a check value generated based on a key of the terminal and at least part of contents of the access rejection message.

Another access rejection method is provided according to an embodiment of the present disclosure, and the method includes steps described below. A terminal sends an access request to a first base station; and the terminal receives an access rejection message fed back by the first base station; where the access rejection message carries at least a check value generated based on the key of the terminal and at least part of contents of the access rejection message.

Still another access rejection method is provided according to an embodiment of the present disclosure, and the method includes steps described below. A second base station receives a request message aimed for a terminal from a first base station; and the second base station sends a response message to the first base station; where the request message carries part or all of contents of an access rejection message aimed for the terminal, and the response message carries a check value generated based on a key and part or all of the contents of the access rejection message.

An access rejection apparatus applied to a first base station is provided according to another embodiment of the present disclosure, and the apparatus includes a first receiving module and a first sending module. The first receiving module is configured to receive an access request of a terminal; and the first sending module is configured to send an access rejection message to the terminal; where the access rejection message carries at least a check value generated based on a key of the terminal and at least part of contents of the access rejection message.

An access rejection apparatus applied to a terminal is provided according to another embodiment of the present disclosure, and the apparatus includes a sending module and a receiving module. The sending module is configured to send an access request to a first base station; and the receiving module is configured to receive an access rejection message fed back by the first base station; where the access rejection message carries at least a check value generated based on a key of the terminal and at least part of contents of the access rejection message.

An access rejection apparatus applied to a second base station is provided according to another embodiment of the present disclosure, and the apparatus includes a receiving module and a sending module. The receiving module is configured to receive a request message aimed for a terminal from a first base station; and the sending module is configured to send a response message to the first base station; where the request message carries part or all of contents of the access rejection message aimed for the terminal, and the response message carries a check value generated based on a key and at least part of the contents of the access rejection message.

An access rejection system is provided according to another embodiment of the present disclosure, and the system includes a first base station and a terminal; where
   the terminal is configured to send an access request;

the first base station is configured to receive the access request and send an access rejection message based on the access request; and the terminal is configured to receive the access rejection message;

where the access rejection message carries at least a check value generated based on a key of the terminal and at least part of contents of the access rejection message.

A first storage medium is further provided according to another embodiment of the present disclosure, the storage medium includes stored programs, which, when executed, perform the aforementioned access rejection method applied to the first base station.

A second storage medium is further provided according to another embodiment of the present disclosure, this storage medium includes stored programs, which, when executed, perform the aforementioned access rejection method applied to the terminal.

A third storage medium is further provided according to another embodiment of the present disclosure, this storage medium stored programs, which, when executed, perform the aforementioned access rejection method applied to the second base station.

A first processer is further provided according to another embodiment of the present disclosure, and the processor is used to run a program, when the program is executed, performs the aforementioned access rejection method applied to the first base station.

A second processer is further provided according to another embodiment of the present disclosure, and the processor is used to run a program, when the program is executed, performs the aforementioned access rejection method applied to the terminal.

A third processer is further provided according to another embodiment of the present disclosure, and the processor is used to run a program, when the program is executed, performs the aforementioned access rejection method applied to the second base station.

According to the embodiments of the present disclosure, the check value generated based on the key of the terminal and part or all of the contents of the access rejection message is carried in the access rejection message, after receiving the access rejection message, the terminal may use the check value to perform a legality verification to determine legality of the sending base station, solving the technical problem in the related art that the terminal cannot verify the legality of the access rejection message, thus improving the security of interactions between a base station and a terminal.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure, and do not form improper limits to the present disclosure. In the drawings.

DETAILED DESCRIPTION

Hereinafter the present disclosure will be described in detail with reference to the drawings in conjunction with the embodiments. It is to be noted that if not in collision, the embodiments and features therein in the present application may be combined with each other.

It is to be noted that the terms of "first", "second" and the like in the description, claims and drawings of the present disclosure are used to distinguish between similar objects and are not necessarily used to describe a particular order or sequence.

Embodiment One

Network architecture of the embodiments of the present application includes at least one base station and a terminal, where interaction is performed between the base station and the terminal.

Figure 2:
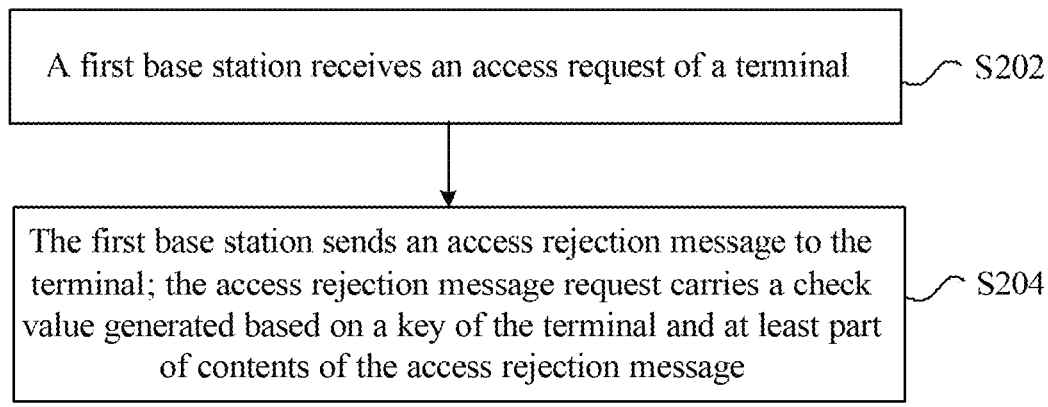
FIG. 2 is a flowchart of an access rejection method according to an embodiment of the present disclosure.

An access rejection method executed on the above network architecture is provided in the present embodiment. FIG. 2 is a flowchart of an access rejection method according to an embodiment of the present disclosure. As shown in FIG. 2, the process of the method includes steps described below.

Step S202, a first base station receives an access request of a terminal.

Step S204, the first base station sends an access rejection message to the terminal; where the access rejection message carries at least a check value generated based on a key of the terminal and at least part of contents of the access rejection message.

Those skilled in the art should understand that the at least part of the contents of the access rejection message may be part or all of the contents of the access rejection message.

Through the above steps, the check value is carried in the access rejection message, after receiving the access rejection message, the terminal may use the check value to perform a legality verification to determine the legality of the sending base station, so that the technical problem in the related art that the terminal cannot verify legality of the access rejection message is solved, thereby improving the security of interactions between the base station and the terminal.

Optionally, the above steps may be executed by the base station, such as a gNB, an eNB, and an NB, but may not be limited thereof.

Optionally, an access rejection request may also carry a waiting time for indicating the terminal to try next time.

Optionally, the method of the present embodiment further includes obtaining the check value, which may be obtained and gained in a following manner.

Before the first base station sends the access rejection message to the terminal, the method further includes steps described below.

S11, the first base station sends a request message to a second base station, where the request message carries part or all of the contents of the access rejection message.

S12, the first base station receives a response message aimed for the request message fed back by the second base station, where the response message carries the check value generated based on the key and at least part of the contents of the access rejection message. There are many ways to generate the check value, such as a function value of a Hash-based Message Authentication Code-Secure Hash Algorithm-256 (HMAC-SHA-256) is calculated using the key and waiting time as parameters, or the key and the waiting time are concatenated into a string to calculate the function value of secure Hash function (SHA-256) thereof.

As another manner, before the first base station sends the access rejection message to the terminal, the method further includes steps described below.

S21, the first base station sends a security information request to the second base station.

S22, the first base station receives a security information response fed back by the second base station, where the security information response carries the key.

S23, the first base station generates the check value according to the key and at least part of the contents of the access rejection message. There are many ways to generate the check value (also called a token), such as calculating the function value of the HMAC-SHA-256 with the key and the waiting time as parameters, or concatenating the key and the waiting time into a string to calculate the function value of SHA-256 thereof. This type of Hash algorithm may map an input value into a fixed-length value, and a collision probability is very low, that is, a probability of obtaining a same output value from different input values is very low, so that it may be determined whether input values are the same by comparing output values.

Optionally, when a current congestion coefficient is greater than a first threshold value, and/or a number of currently accessed terminals is greater than a second threshold value, the first base station sends the access rejection message is to the terminal.

In the present embodiment, the second base station releases a connection with the terminal before the terminal sends the access request to the first base station. When the terminal accesses to the second base station, the second base station saves relevant information of the terminal, such as the key and etc.

Figure 3:
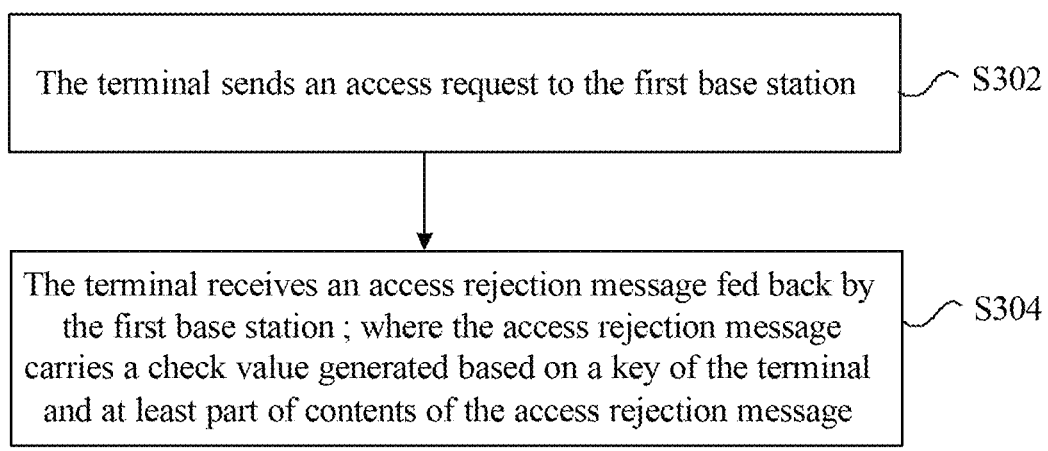
FIG. 3 is a flowchart of another access rejection method according to an embodiment of the present disclosure.

Another access rejection method executing on the network architecture is provided in the present embodiment. FIG. 3 is a flowchart of another access rejection method according to an embodiment of the present disclosure. As shown in FIG. 3, the process of the method includes steps described below.

Step S302, the terminal sends the access request to the first base station.

Step S304, the terminal receives the access rejection message fed back by the first base station; where the access rejection message carries at least the check value generated based on the key of the terminal and at least part of the contents of the access rejection message.

Optionally, after the terminal receives the access rejection message fed back by the first base station, the method further includes steps described below.

S31, the terminal calculates a check value based the key and at least part of the contents of the access rejection message.

S32, when the calculated check value is same as the received check value, the access rejection message is accepted, and when the calculated check value is different from the received check value, the access rejection message is discarded. The key may be preset in the terminal in advance.

An access rejection method is further provided according to the present embodiment, and the method includes steps described below. The second base station receives the request message aimed for the terminal from the first base station; and the second base station sends the response message to the first base station; where the request message carries part or all of the contents of the access rejection message aimed for the terminal, and the response message carries the check value generated based on the key and at least part of the content of the access rejection message.

Optionally, before receiving the request message from the first base station, the second base station releases the connection with the terminal.

From the description of the above-mentioned embodiments, it will be apparent to those skilled in the art that the methods in the embodiments described above may be implemented by software plus a necessary general-purpose hardware platform, or may of course be implemented by hardware. However, in many cases, the former is a preferred implementation manner. Based on this understanding, the technical solutions provided by the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal apparatus (which may be a mobile phone, a computer, a server, a network apparatus or the like) to execute the methods according to each embodiment of the present disclosure.

Embodiment Two

The present embodiment further provides an access rejection apparatus and system for implementing the embodiments and preferred embodiments described above. What has been described will not be repeated here. As used below, the term of "module" may be software, hardware or a combination thereof, which is capable of implementing predetermined functions. The apparatuses in the embodiment described below are preferably implemented by software, but implementation by hardware or by a combination of software and hardware is also possible and conceivable.

Figure 4:
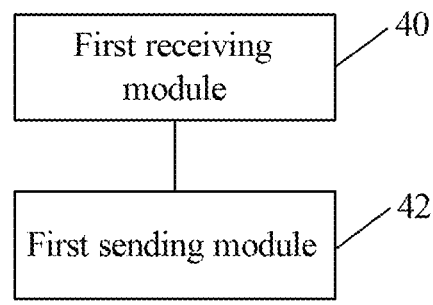
FIG. 4 is a structural block diagram of an access rejection apparatus according to an embodiment of the present disclosure.

FIG. 4 is a structural block diagram of an access rejection apparatus according to an embodiment of the present disclosure, the apparatus is applied to a first base station. As shown in FIG. 4, the apparatus includes a first receiving module 40 and a first sending module 42.

The first receiving module 40 is configured to receive an access request of a terminal; and the first sending module 42 is configured to send an access rejection message to the terminal;

where the access rejection message carries a check value generated based on a key of the terminal and at least part of contents of the access rejection message.

Optionally, the apparatus further includes a second sending module and a second receiving module. The second sending module is configured to send a request message to a second base station before the first sending module 42 sends the access rejection message to the terminal, where the request message carries part or all of the contents the access rejection message; and correspondingly, the second receiving module is configured to receive a response message fed back by the second base station, where the response message carries the check value generated based on the key and part or all of the contents of the access rejection message.

Optionally, the apparatus further includes a third sending module, a third receiving module and a generation module, the third sending module is configured to send a security information request to the second base station before the first sending module 42 sends the access rejection message to the terminal;

correspondingly, the third receiving module is configured to receive a security information response fed back by the second base station, where the security information response carries the key; and the generation module is configured to generate the check value according the key and part or all of the contents of the access rejection message.

Optionally, the first sending module is further configured to send the access rejection message to the terminal when the first base station satisfies at least one of following conditions: a current congestion coefficient is greater than a first threshold value, or a number of currently accessed terminals is greater than a second threshold value.

Figure 5:
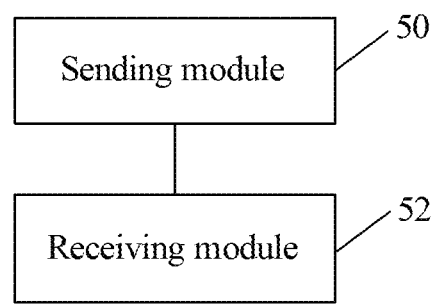
FIG. 5 is a structural block diagram of another access rejection apparatus according to an embodiment of the present disclosure.

FIG. 5 is a structural block diagram of another access rejection apparatus according to an embodiment of the present disclosure, the apparatus is applied to a terminal and includes a sending module 50 and a receiving module 52.

The sending module 50 is configured to send the access request to the first base station; and the receiving module 52 is configured to receive the access rejection message fed back by the first base station;

where the access rejection message carries the check value generated based on the key of the terminal and at least part of the contents (part or all of the contents) of the access rejection message.

The apparatus further includes a calculation module and a processing module. The calculation module is configured to calculate a check value according to the key and part or all of the contents of the access rejection message after the receiving module 52 receives the access rejection message fed back by the first base station; and the processing module is configured to: accept the access rejection message when the calculated check value is the same as the received check value, and discard the access rejection message when the calculated check value is different from the received check value.

An access rejection apparatus applied to a second base station is further provided by the present embodiment, and the apparatus includes a receiving module and a sending module.

The receiving module is configured to receive the request message aimed for the terminal from the first base station, where the request message carries part or all of the contents of the access rejection message aimed for the terminal; the sending module is configured to send the response message to the first base station; where the response message carries the check value generated based on the key and at least part of the contents (part or all of the contents) of the access rejection message.

Figure 6:
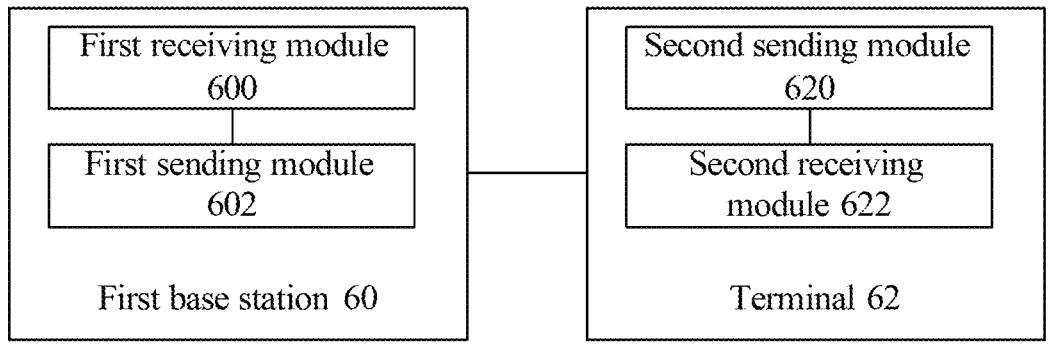
FIG. 6 is a structural block diagram of an access rejection system according to an embodiment of the present disclosure.

FIG. 6 is a structural block diagram of an access rejection system according to an embodiment of the present disclosure, the system includes a first base station 60 and a terminal 62.

The terminal 62 is configured to send an access request;

the first base station 60 is configured to receive the access request and send an access rejection message; and the terminal 62 is configured to receive the access rejection message fed back by the first base station 60; where the access rejection message carries at least a check value generated based on a key of the terminal and at least part of contents of the access rejection message.

In an optional embodiment, the first base station 60 includes a first receiving module 600 and a first sending module 602.

The first receiving module 600 is configured to receive the access request sent by the terminal, specifically a second sending module 620; and the first sending module 602 is configured to send the access rejection message to the terminal, specifically a second receiving module 622.

The terminal 62 includes the second sending module 620 and the second receiving module 622.

The second sending module 620 is configured to send the access request to the first base station 60, specifically the first receiving module 600; and the second receiving module 622 is configured to receive the access rejection message fed back by the first base station, specifically the first sending module 602;

where the access rejection message carries the check value generated based on the key of the terminal and at least part of the contents (part or all of the contents) of the access rejection message.

Optionally, the system further includes a second base station, where the second base station includes a third receiving module and a third sending module, the third receiving module is configured to receive a request message aimed for the terminal from the first base station; and the third sending module is configured to send a response message to the first base station; where the request message carries part or all of the contents of the access rejection message aimed for the terminal, and the response message carries the check value generated based on the key and part or all of the contents of the access rejection message.

The first base station 60 and the terminal 62 may also include one or more apparatuses included in the above contents.

It should be noted that each of the modules described above may be implemented by software or hardware. Implementations by hardware may, but may not necessarily, be performed in a following manner: the various modules described above are all located in a same processor, or the various modules described above are located in their respective processors in any combination form.

Embodiment Three

This embodiment is an optional embodiment of the present application and used for describing in detail in conjunction with specific implementation modes.

It may be understood that the present embodiment provides a related method for rejecting an access of a terminal in an inactive state.

Figure 7:
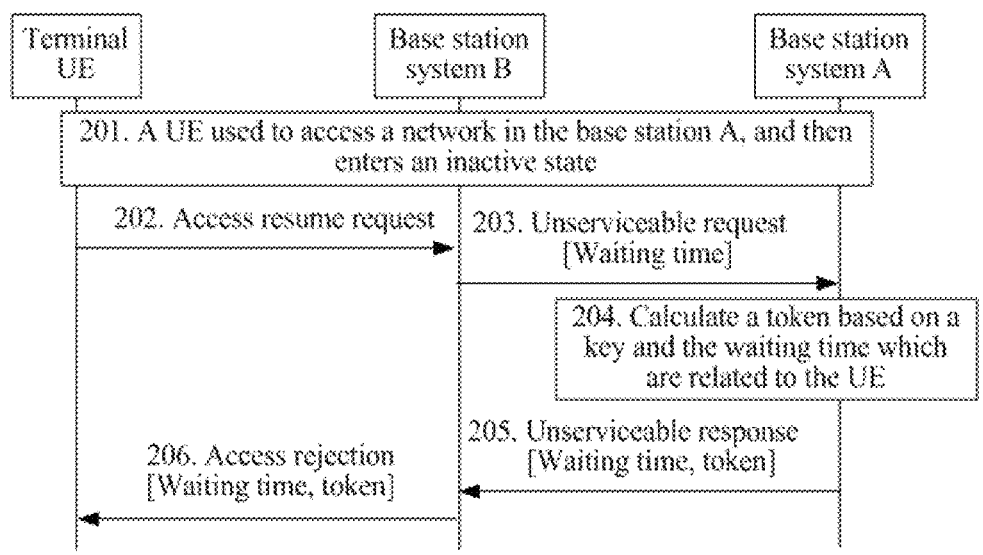
FIG. 7 is schematic flowchart one of an access rejection method according to an embodiment of the present disclosure.

FIG. 7 is schematic flowchart one of an access rejection method according to an embodiment of the present disclosure. As shown in FIG. 7, the process includes steps described below.

Figure 1:
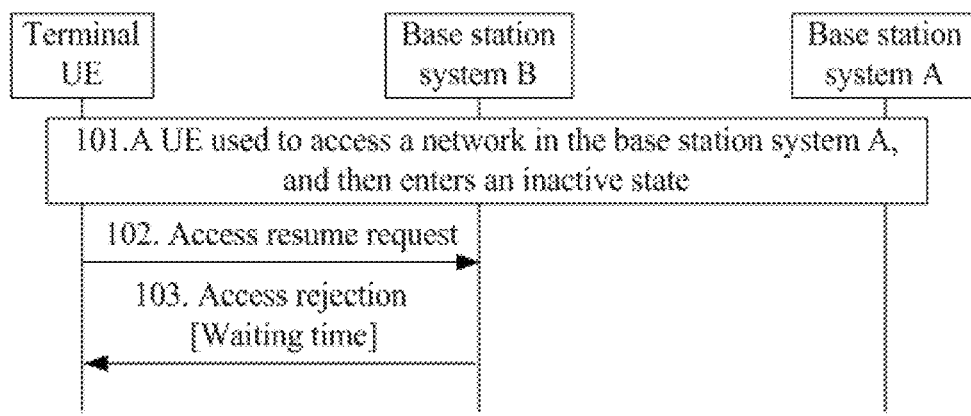
FIG. 1 is a schematic flowchart of an access rejection in the related art of the present disclosure.

Steps 201 and 202: same as Steps 101 and 102 of FIG. 1

Step 203: a base station system B receives an access resume request, due to the congestion and other reasons thereof, it is hoped that the terminal will wait for a period of time before attempting to regain an access, therefore, the base station system B sends an unserviceable request, such as a service deny request message, to a base station system A while carries information of the waiting time, such as a wait timer.

Step 204: the base station system A calculates a token based on the key and the waiting time which are related to the UE, for example, the function value of the HMAC-SHA-256 is calculated using the key and the waiting time as parameters, or the key and the waiting time are concatenated into a string to calculate the function value of the SHA-256 thereof.

Step 205, the base station system A sends an unserviceable response, such as a service deny response message, to the base station system B while carries the information of the waiting time and the calculated token.

Step 206: the base station system B sends the access rejection message, such as a reject message, to the UE while carries the received the information of the waiting time and the received token, the terminal uses the same calculation method to calculate a token, and compares whether the calculated token and the received token are the same, if the calculated token and the received token are the same, the access rejection message is accepted, and if the calculated token and the received token are different, the access rejection message is not accepted, for example, the message is discarded.

Figure 8:
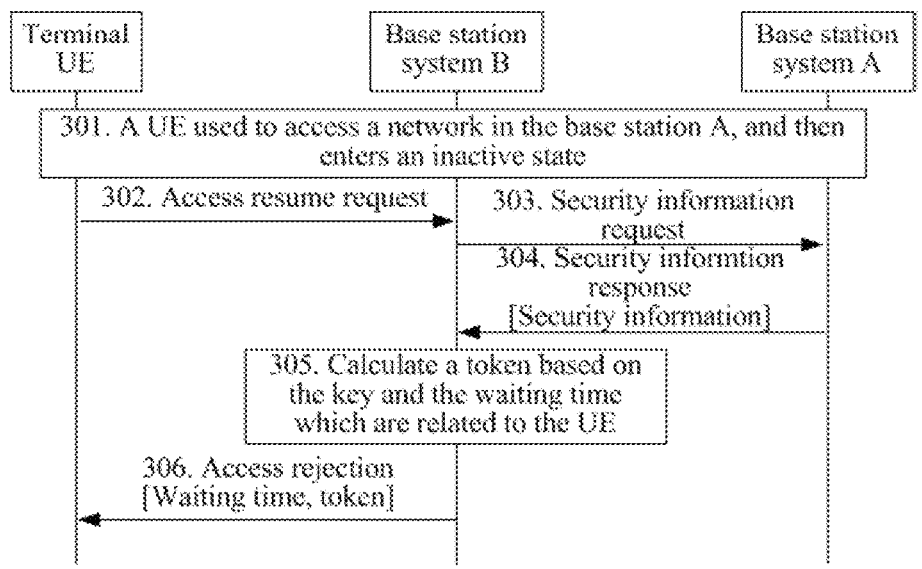
FIG. 8 is schematic flowchart two of an access rejection method according to an embodiment of the present disclosure.

FIG. 8 is schematic flowchart two of an access rejection method according to an embodiment of the present disclosure. As shown in FIG. 8, the process includes steps described below.

Steps 301 and 302: same as Steps 101 and 102 of FIG. 1

Step 303: the base station system B receives an access resume request, due to the congestion and other reasons thereof, it is hoped that the terminal will wait for a period of time before attempting to regain the access, therefore, the base station system B sends a security information request, such as a security info request message, to the base station system A.

Step 304, the base station system A sends a security information response, such as a security info response message, to the base station system B while carries the UE-related security information, including the key.

Step 305: the base station system B calculates a token based on the key and the waiting time which are related to the UE, for example, the function value of the HMAC-SHA-256 is calculated using the key and the waiting time as parameters, or the key and the waiting time are concatenated into a string to calculate the function value of the SHA-256 thereof.

Step 306: the base station system B sends the access rejection message, such as the reject message, to the UE while carries the information of the waiting time and the token, the terminal uses the same calculation method to calculate a token, and compares whether the calculated token and the received token are the same, if the calculated token and the received token are the same, the access rejection message is accepted, and if the calculated token and the received token are different, the access rejection message is not accepted, for example, the message is discarded.

Figure 9:
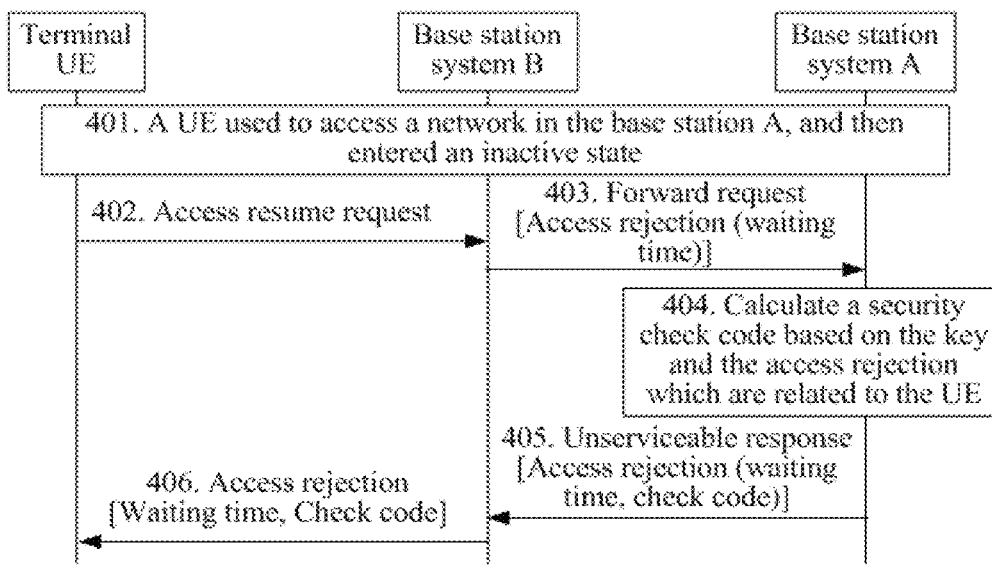
FIG. 9 is schematic flowchart three of an access rejection method according to an embodiment of the present disclosure.

FIG. 9 is schematic flowchart three of an access rejection method according to an embodiment of the present disclosure. As shown in FIG. 9, the process includes steps described below.

Steps 401 and 402: same as Steps 101 and 102 of FIG. 1

Step 403: the base station system B receives the access resume request, due to the congestion and other reasons thereof, it is hoped that the terminal will wait for a period of time before attempting to regain the access, therefore, the base station system B sends a forward request, such as a forward request message, to the base station system A while carries the access rejection message sent by the base station B to the UE, for example, the reject message, and the access rejection message carries the information of the waiting time, such as a wait timer.

Step 404: the base station system A calculates a message check code based on the key and the access rejection message which are related to the UE, for example, the function value of the HMAC-SHA-256 is calculated using the key and the contents of the access rejection message as parameters.

Step 405, the base station system A sends a forward response, such as a forward response message, to the base station system B while carries a processed access rejection message, that is, the access rejection message carries a message check code.

Step 406: the base station system B sends the access rejection message to the UE, the terminal uses the same calculation method as the base station A to calculate a message check code, and compares whether the calculated message check code and the received message check code are the same, if the calculated message check code and the received message check code are the same, the access rejection message is accepted, and if the calculated message check code and the received message check code are different, the access rejection message is not accepted, for example, the message is discarded.

Embodiment Four

An embodiment of the present disclosure also provides three types of computer storage media, which include respective stored programs. Where, a program stored in a first computer storage medium performs the aforementioned access rejection method applied to the first base station when executed; a program stored in a second computer storage medium performs the aforementioned access rejection method applied to the terminal when executed; and a program stored in a third computer storage medium performs the aforementioned access rejection method applied to the second base station when executed.

In the present embodiment, the above storage media may include, but are not limited to, a USB flash disk, a read-only memory (ROM), a random access memory (RAM), a mobile hard disk, a magnetic disk, an optical disk or another medium capable of storing program codes.

An embodiment of the present disclosure also provides three types of processors, each type of which is used to execute respective programs. Where a first type of the processor executes the aforementioned access rejection method applied to the first base station when executes the program stored in the first type of the storage medium. A second type of the processor executes the aforementioned access rejection method applied to the terminal when executes the program stored in the second type of the storage medium. And a third type of the processor executes the aforementioned access rejection method applied to the second base station when executes the program stored in the third type of the storage medium.

Optionally, for specific examples in the present embodiment, reference may be made to the examples described in the above embodiments and optional implementations, and a repetition is not made in the present embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and optionally, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are merely preferred embodiments of the present disclosure and are not intended to limit the present disclosure. Those skilled in the art can make various modifications and changes. Any modifications, equivalent substitutions, improvements and the like made within the principle of the present disclosure should fall within the scope of the present disclosure.

It should be understood by those skilled in the art that the embodiments of the present disclosure may be provided as methods, systems or computer program products. Therefore, the present disclosure may be embodied in the form of a hardware embodiment, a software embodiment, or a combination of hardware and software embodiments. In addition, the present disclosure may be embodied in the form of a computer program product implemented on one or more computer-usable storage media (including, but not limited to, a disk memory, an optical memory and the like) which include computer-usable program codes.

The present disclosure is described with reference to flowcharts and/or block diagrams of the methods, apparatuses (systems) and computer program products according to the embodiments of the present disclosure. It should be understood that computer program instructions may implement each flow and/or block in the flowcharts and/or the block diagrams and a combination of flows and/or blocks in the flowcharts and/or the block diagrams. These computer program instructions may be provided for a general-purpose computer, a special-purpose computer, an embedded processor or a processor of another programmable data processing apparatus to produce a machine so that instructions executed by the computer or the processor of another programmable data processing apparatus produce an apparatus for implementing functions designated in one or more flows in the flowcharts and/or one or more blocks in the block diagrams.

These computer program instructions may be stored in a computer-readable memory that can cause the computer or another programmable data processing apparatus to operate in a particular manner so that the instructions stored in the computer-readable memory produce a manufactured product including an instruction apparatus. The instruction apparatus implements the functions designated in the one or more flows in the flowcharts and/or the one or more blocks in the block diagrams.

These computer program instructions may be loaded into the computer or another programmable data processing apparatus so that a series of operation steps are performed on the computer or another programmable apparatus to produce processing implemented by the computer. Therefore, instructions executed on the computer or another programmable apparatus provide steps for implementing the functions designated in the one or more flows in the flowcharts and/or the one or more blocks in the block diagrams.

The above are only preferred embodiments of the present disclosure and are not intended to limit the scope of the present disclosure.

INDUSTRIAL APPLICABILITY

In the embodiment of the present disclosure, by carrying the check value generated based on the key of the terminal and part or all of the content of the access rejection message in the access rejection message, after receiving the access rejection message, the terminal may use the check value to perform legality verification to determine the legality of the sending base station, solving the technical problem that the terminal in the related art cannot verify the legality of the access rejection message and improving the security of the interaction between the base station and the terminal.

What is claimed is:

1. A method, comprising:
   receiving, by a first base station, an access resume request from a terminal;
   receiving, by the first base station from a second base station, an access rejection message, the access rejection message including:
      a first check value generated by the second base station according to a key of the terminal and content of the access rejection message, wherein the first check value is indicative of authenticity of the second base station providing the access rejection message, and
      a waiting time indicative of a time for the terminal to send another access resume request;
   sending, by the first base station to the terminal, the access rejection message in response to the access resume request; and
   receiving, by the first base station, subsequent to the waiting time, a second access resume request from the terminal upon the terminal (i) generating a second check value according to the key and the access rejection message, and (ii) determining to accept the access rejection message as authentic, based on a determination that the second check value corresponds to the received first check value.

2. A base station, comprising:
   at least one processor configured to:
      receive an access resume request from a terminal;
      receive, from a second base station, an access rejection message, the access rejection message including:
         a first check value generated by the second base station according to a key of the terminal and content of the access rejection message, wherein the first check value is indicative of authenticity of the second base station providing the access rejection message, and
         a waiting time indicative of a time for the terminal to send another access resume request;

send, to the terminal, the access rejection message in response to the access resume request; and receive, subsequent to the waiting time, a second access resume request from the terminal upon the terminal (i) generating a second check value according to the key and the access rejection message, and (ii) determining to accept the access rejection message as authentic, based on a determination that the second check value corresponds to the received first check value.

3. A base station, comprising:

at least one processor configured to:

receive an access resume request from a terminal;

receive, from a second base station, an access rejection message, the access rejection message including:

a first check value generated by the second base station according to a key of the terminal and content of the access rejection message, wherein the first check value is indicative of authenticity of the second base station providing the access rejection message, and a waiting time indicative of a time for the terminal to send another access resume request;

send, to the terminal, the access rejection message in response to the access resume request; and receive, independent of the waiting time, a second access resume request from the terminal upon the terminal (i) generating a second check value according to the key and the access rejection message, and (ii) determining to discard the access rejection message as inauthentic, based on a determination that the second check value does not correspond to the received first check value.

* * * * *